(12) United States Patent
Billiani et al.

(10) Patent No.: US 8,546,479 B2
(45) Date of Patent: Oct. 1, 2013

(54) AQUEOUS BINDERS FOR COATINGS WITH IMPROVED GLOSS

(75) Inventors: Johann Billiani, Graz (AT); Karl Rossmann, Berndorf (AT); Rami-Raimund Awad, Graz (AT); Thomas Fraydl, Graz (AT); Ingo Kriessmann, Graz (AT)

(73) Assignee: Cytec Surface Specialties Austria GmbH (AT)

( * ) Notice: Subject to any disclaimer, the term of this patent is extended or adjusted under 35 U.S.C. 154(b) by 514 days.

(21) Appl. No.: 12/293,091

(22) PCT Filed: Mar. 4, 2007

(86) PCT No.: PCT/EP2007/001848
§ 371 (c)(1),
(2), (4) Date: Mar. 18, 2009

(87) PCT Pub. No.: WO2007/107231
PCT Pub. Date: Sep. 27, 2007

(65) Prior Publication Data
US 2009/0221741 A1    Sep. 3, 2009

(30) Foreign Application Priority Data
Mar. 17, 2006  (EP) ..................................... 06005439

(51) Int. Cl.
*C08G 18/67* (2006.01)
(52) U.S. Cl.
USPC ........... 524/537; 524/502; 524/539; 524/558; 525/221

(58) Field of Classification Search
USPC .................. 524/502, 537, 539, 558; 525/221
See application file for complete search history.

(56) References Cited

U.S. PATENT DOCUMENTS

| | | | |
|---|---|---|---|
| 4,546,046 A | | 10/1985 | Etzell et al. |
| 4,798,745 A | * | 1/1989 | Martz et al. ................ 427/407.1 |
| 5,362,773 A | | 11/1994 | Brindoepke et al. |
| 6,008,291 A | * | 12/1999 | Weinberger et al. .......... 524/802 |
| 6,359,029 B1 | * | 3/2002 | Kriessmann et al. .......... 523/172 |
| 2005/0165159 A1 | * | 7/2005 | Ogura et al. .................. 524/560 |

FOREIGN PATENT DOCUMENTS

| | | |
|---|---|---|
| EP | 0584734 A2 | 3/1994 |
| WO | WO-2004/000958 A1 | 12/2003 |

* cited by examiner

*Primary Examiner* — Ling Choi
*Assistant Examiner* — Wenwen Cai
(74) *Attorney, Agent, or Firm* — Novak Druce Connolly Bove + Quigg LLP

(57) ABSTRACT

A water-reducible mixture of (meth)acrylic copolymers having a hydroxyl number of from 40 mg/g to 250 mg/g, an acid number of from 15 mg/g to 80 mg/g, a weight average molar mass $M_w$ from 9 kg/mol to 40 kg/mol and a glass transition temperature $T_g$ from −40° C. to 80° C., based on polymerised monomers comprising at least one alkyl ester A of an olefinically un-saturated carboxylic acid having from 1 to 8 carbon atoms in the alkyl group, at least one hydroxy functional alkyl ester B of an olefinically unsaturated carboxylic acid, at least one aliphatic compound C that has both hydroxy and carboxyl functionalities, or which is a lactone or a cyclic lactone, at least one vinyl monomer D which does not comprise a moiety derived from an olefinically unsaturated carboxylic acid, at least one olefinically unsaturated carboxylic acid E, a process for its preparation, and a method of use thereof in the preparation of paints.

10 Claims, No Drawings

AQUEOUS BINDERS FOR COATINGS WITH IMPROVED GLOSS

RELATED APPLICATIONS

This application is a national stage application (under 35 U.S.C. 371) of PCT/EP2007/001848, filed Mar. 4, 2007, which claims benefit of European application 06005439.2, filed Mar. 17, 2006.

The invention relates to aqueous binders for coatings with improved gloss.

In automotive coatings, there is a need for coating compositions leading to coating films having, at the same time, good mechanical, chemical, and optical properties, such as hardness, elasticity, scratch resistance, resistance against dilute acids and water, as well as high gloss and low haze.

It has been known that scratch resistant coatings can be obtained from hydroxy-functional solution (meth)acrylic copolymers which are modified with lactones. In U.S. Pat. No. 4,546,046, for example, solvent borne coating compositions for automotive coatings are described that are based on ε-caprolactone-modified (meth)acrylic copolymers and aminoplast cross-linking agents. The (meth)acrylic copolymers comprise moieties based on reaction products of carboxy-functional or hydroxy-functional unsaturated monomers and ε-caprolactone. Modification of the said monomers with ε-caprolactone may be made by adding the lactone to the said monomers before or during the polymerisation, which said monomers react under ring opening and addition to the lactone under formation of chain-extended vinyl monomers having hydroxyl or carboxyl functionalities, or after the polymerisation reaction, in the form of a polymer analogous reaction.

While such modification leads to improved scratch resistance of the coating film formed from such binder, the optical properties of the coating film are impaired by such modification.

It is therefore an object of the invention to provide a binder which leads to coating films having both the improved scratch resistance of the prior art, yet also improved gloss and reduced haze.

It is a further object of the present invention to provide a water reducible binder having the said properties.

These objects of the present invention are achieved by water-reducible hydroxy-functional binders based on (meth)acrylic copolymers which, when used in one-component and two-component coating compositions, produce flexible scratch resistant coatings with very good chemical and acid resistance. When applied as a clear coat to solvent-based base coats in particular, there is no or only a slight dissolution of the base coat.

The present invention is directed to a water-reducible mixture of (meth)acrylic copolymers having a hydroxyl number of from 40 mg/g to 250 mg/g, an acid number of from 15 mg/g to 80 mg/g, a weight average molar mass ($M_w$) from 9 kg/mol to 40 kg/mol and a glass transition temperature $T_g$ from −40° C. to 80° C., based on polymerised monomers comprising at least one alkyl ester A of an olefinically unsaturated carboxylic acid having from 1 to 8 carbon atoms in the alkyl group, at least one hydroxy functional alkyl ester B of an olefinically unsaturated carboxylic acid, at least one aliphatic compound C that has both hydroxy and carboxyl functionalities, or which is a (cyclic) lactone, at least one vinyl monomer D which does not comprise a moiety derived from an olefinically unsaturated carboxylic acid, at least one olefinically unsaturated carboxylic acid E, and optionally, at least one epoxy functional alkyl ester F of an olefinically unsaturated carboxylic acid, and also optionally, at least one alkyl ester G of an olefinically unsaturated carboxylic acid having from 9 to 40 carbon atoms in the alkyl group.

The present invention is also directed to a process of making the said mixture of copolymers in a two-step reaction, wherein, in the first step, a hydroxy functional acrylate copolymer 1 is prepared by polymerising a mixture of monomers containing at least one monomer each of the groups of A, B, C, D, and optionally, at least one of the groups of F and G, to obtain a hydroxy functional copolymer 1, in a separate second step, a carboxyl functional copolymer 2 is prepared by polymerising a mixture of monomers containing at least one monomer each of the groups of A, D, and E, and in a third consecutive step, performing a condensation reaction between polymers 1 and 2 under esterification conditions to obtain, under consumption of from 0.5% to 20% of the carboxyl groups of copolymer 2 which carboxyl groups are consumed by esterification with hydroxyl groups of copolymer 1, a polymer 12, in a mixture with unreacted copolymers 1 and 2.

Polymerisation for each of the polymers 1 and 2 is usually conducted in a solvent that is inert under the conditions of a radically initiated polymerisation, such as alcohols, esters or ketones. It is also possible to use a cyclic lactone C, or a monomer according to A which has a low tendency for copolymerisation, as solvents in the polymerisation step. These compounds are incorporated into the polymer in the final phase of the polymerisation process and thus help to reduce the amount of solvent used which has to be distilled off afterwards.

The esterification process is usually conducted when the solvents are fully or nearly fully removed, at a temperature of from 100° C. to 160° C., and conducted for a sufficient amount of time to consume from 0.5% to 20% of the carboxyl groups of polymer 2, and to render the mixture of condensation product 12 and unreacted polymers 1 and 2 water-dilutable. This can be monitored by taking samples from the reaction vessel and diluting it with water after at least partial neutralisation of the remaining acid groups.

As monomers A, alkyl esters of alcohols A1 having from 1 to 8 carbon atoms in the alkyl group, of olefinically unsaturated carboxylic acids A2 are preferred. Particularly preferred are esters of linear or branched aliphatic olefinically unsaturated carboxylic acids A21 having from one to three, preferably one or two, carboxylic acid groups per molecule. Particularly preferred are esters of monocarboxylic olefinically unsaturated carboxylic acids such as acrylic acid, methacrylic acid, crotonic acid, isocrotonic acid, and vinyl acetic acid. It is also possible to use dialkyl esters of dicarboxylic olefinically unsaturated acids A22, such as maleic acid, fumaric acid, citraconic acid, itaconic acid, and mesaconic acid. It is especially preferred to use branched or linear $C_1$- to $C_8$-alkyl esters of acrylic and methacrylic acids, alone, or in mixture. With particular preference, the esters of methanol, ethanol, n- and iso-propanol, n-butanol, n-hexanol, n-octanol, and 2-ethyl hexanol, with acrylic and methacrylic acids are used.

As monomers B, esters of polyhydric, preferably dihydric, linear, branched and cyclic aliphatic alcohols B1 with acids B2 which are selected from the same group as mentioned under A2 are used, which esters are hydroxy functional, i.e. on the average, the number of hydroxyl groups per molecule of B1 is larger than the number of acid groups in the acids B2. Preferably, the average number of remaining (i.e. non-esterified) hydroxyl groups per molecule of monomer B is from 0.5 to 1.5, particularly preferably, from 0.7 to 1.3, and especially preferred, from 0.8 to 1.2. Preferred are esters of dihydric alcohols such as ethylene glycol, 1,2- and 1,3-propane diol, 1,4-butane diol, neopentyl glycol, 1,6-hexane diol, and trimethyl 1,6-hexane diol with monocarboxylic unsaturated carboxylic acids such as acrylic or methacrylic acids. Esters with more than one hydroxy group per molecule are preferably glycerol mon(meth)acrylate and pentaerythritol di(meth) acrylate, while an average hydroxy functionality of less than one is achieved by mixing esters A with monohydroxy esters according to B.

As monomers C, aliphatic linear, branched or cyclic hydroxy acids may be used which preferably have from 2 to 20 carbon atoms, and at least one hydroxyl and at least one carboxyl group. It is also possible to use oligomeric compounds that are poly-oligoesters from such hydroxy acids, such as oligo- or poly-caprolactone, oligo- or poly-butyrolactone, and oligo- or poly-valerolactone, cyclic lactones such as the said lactones themselves, and mixed oligo- and polyesters from lactones such as those mentioned. Particularly preferred are gamma-butyrolactone, delta-valerolactone, and epsilon-caprolactone.

As monomers D, which do not comprise a moiety derived from an olefinically unsaturated carboxylic acid, all vinyl monomers can be used that fulfill this requirement, such as esters of vinyl alcohol or allyl alcohol with acids, such as vinyl acetate, vinyl propionate, or the allyl and vinyl esters of branched aliphatic carboxylic acids where the branching is in the alpha position relative to the carboxyl group, such as isobutyric acid, 2-methylvaleric acid, pivalic acid, neohexanoic acid, 2-methyl oenanthic acid, 2-ethylhexanoic acid, neooctanoic acid, and neodecanoic acids, or mixtures thereof, as well as vinyl or allyl ethers, vinyl ketones, and vinyl aromatic monomers can preferably be used that have at least one olefinic unsaturation and at least one aromatic moiety, such as styrene, substituted styrenes such as chlorostyrene, methoxy styrene, vinyl toluene, alpha-methyl styrene, divinyl benzene, and vinyl naphthalene. Preferably, the amount-of-substance fraction of divinyl or polyvinyl monomers having more than one olefinic unsaturation is kept below 10% because gelation may occur if this amount is too high.

As monomers E, the olefinically unsaturated carboxylic acids A21 may be preferably used. Particularly preferred are acrylic and methacrylic acids.

As monomers F, esters of epoxy functional alcohols F1 such as glycidyl alcohol with olefinically unsaturated carboxylic acids A21 are preferred, as well as ethers of epoxy functional alcohols such as glycidyl alcohol with olefinically unsaturated alcohols F2 such as allyl alcohol. Preferred compounds F are glycidyl methacrylate and glycidyl acrylate, as well as diglycidyl maleinate.

As monomers G, alkyl esters of alcohols G1 having from 9 to 40, preferably from 10 to 25, carbon atoms in the alkyl group, of olefinically unsaturated carboxylic acids A2 are preferred. Particularly preferred are esters of linear or branched aliphatic olefinically unsaturated carboxylic acids A21 having from one to three, preferably one or two, carboxylic acid groups per molecule. Particularly preferred are esters of monocarboxylic olefinically unsaturated carboxylic acids such as acrylic acid, methacrylic acid, crotonic acid, isocrotonic acid, and vinyl acetic acid. It is also possible to use dialkyl esters of dicarboxylic olefinically unsaturated acids A22, such as maleic acid, fumaric acid, citraconic acid, itaconic acid, and mesaconic acid. It is especially preferred to use branched or linear $C_9$- to $C_{40}$-alkyl esters of acrylic and methacrylic acids, alone, or in mixture. With particular preference, the esters of n-nonanol (pelargonic alcohol), n-decanol (capric alcohol), n-dodecanol (lauryl alcohol), n- and iso-tridecanol, n-tetradecanol (myristyl alcohol), and of higher fatty alcohols such as cetyl alcohol, margaryl alcohol, stearyl alcohol, arachidyl alcohol, behenyl alcohol, lignoceryl alcohol, ceryl alcohol, montanyl alcohol, myricyl alcohol, melissyl alcohol, laceryl alcohol, and geddyl alcohol with acrylic and methacrylic acids are used.

It has been found in the investigations that have led to the present invention that a ratio of the amount of substance of monomers C to the amount of substance of monomer B should not exceed 1.9, preferably not exceed 1.85, and particularly preferably, not exceed 1.8. Especially favourable results have been achieved if the is ratio does not exceed 1.7.

In a preferred embodiment, the water-reducible mixture of (meth)acrylic copolymers comprises moieties derived from the said monomers A, B, C, D, and E in mass fractions of from 10% to 50% of monomers A, from 5% to 35% of monomers B, from 1% to 25% of monomers C, from 20% to 50% of monomers D, and from 2% to 20% of monomers E, where the sum of all mass fractions equals 100%.

In a further preferred embodiment, the water-reducible mixture of (meth)acrylic copolymers comprises moieties derived from the said monomers A, B, C, D, E, and F in mass fractions of from 10% to 50% of monomers A, from 5% to 35% of monomers B, from 1% to 25% of monomers C, from 20% to 50% of monomers D, from 2% to 20% of monomers E, and from 0.1% to 3.0% of monomers F, where the sum of all mass fractions equals 100%.

In a further preferred embodiment, the water-reducible mixture of (meth)acrylic copolymers comprises moieties derived from the said monomers A, B, C, D, E and G in mass fractions of from 10% to 50% of monomers A, from 5% to 35% of monomers B, from 1% to 25% of monomers C, from 20% to 50% of monomers D, from 2% to 20% of monomers E, and from 0.2% to 15% of monomers G, where the sum of all mass fractions equals 100%.

In a particularly preferred embodiment, the water-reducible mixture of (meth)acrylic copolymers comprises moieties derived from the said monomers in mass fractions of from 15% to 40% of monomers A, from 10% to 30% of monomers B, from 2% to 20% of monomers C, from 25% to 45% of monomers D, from 3% to 15% of monomers E, and optionally, from 0.2% to 2.0% of monomers F, and also optionally, from 2% to 12% of monomers G, where the sum of all mass fractions equals 100%.

The hydroxy functional copolymer 1 preferably has a hydroxyl number of from 50 mg/g to 300 mg/g, particularly preferably from 80 mg/g to 275 mg/g, and a weight average molar mass $M_w$ of from 8 kg/mol to 30 kg/mol. Preferably, the mass fraction of moieties derived from monomers A, B, C, and D in the hydroxy functional copolymer 1 is from 5% to 35% for A, from 15% to 40% for B, from 2% to 20% for C, and from 25% to 55% for D, particularly preferred, from 10% to 25% for A, from 20% to 35% for B, from 5% to 15% for C, and from 30% to 50% for D. If there are moieties derived from monomer F, the mass fraction for F is from 0.1% to 1%, particularly preferred, from 0.2% to 0.8%. If there are moieties derived from monomer G, the mass fraction for G is from 2% to 20%, particularly preferred, from 5% to 15%.

The acid functional copolymer 2 preferably has an acid number of from 100 mg/g to 300 mg/g, particularly preferably from 120 mg/g to 260 mg/g, and a weight average molar mass $M_w$ of from 8 kg/mol to 25 kg/mol. Preferably, the mass fraction of moieties derived from monomers A, D, and E in the acid functional copolymer 2 is from 25% to 80% for A, from 10% to 40% for D, and from 10% to 50% for E, particularly preferred, from 30% to 65% for A, from 15% to 35% for D, and from 15% to 40% for E.

The mixture of the esterification product 12 of the hydroxy functional copolymer 1 and the acid-functional copolymer 2 with the unreacted amounts of these copolymers 1 and 2 preferably has a hydroxyl number of from 40 mg/g to 250 mg/g, particularly preferably from 60 mg/g to 200 mg/g, an acid number of from 15 mg/g to 80 mg/g, particularly preferably from 20 mg/g to 70 mg/g, and a weight average molar mass $M_w$ of from 9 kg/mol to 40 kg/mol.

Neutralisation can be effected with aqueous alkali, and preferably, with ammonia, and organic amines, especially tertiary amines, such as N-methyldiethanolamine, N,N-dimethylethanolamine, and triethanolamine.

The binders obtained are preferably formulated to clearcoat paints or pigmented paints. Usual additives such as defoamers, levelling agents, wetting agents, and coalescing agents, crosslinkers such as those based on aminoplast compounds and isocyanates, and in the case of pigmented paints also dispersing agents and antisettling agents, can be used.

Paints formulated with the binders of the invention are particularly useful for outdoor applications because of their low propensity to yellowing, and their light stability.

EXAMPLES

Example 1

Hydroxy functional (meth)acrylic copolymers 1 have been prepared from monomer mixtures as stated in Table 1. For the comparative (C1 and C2) examples, the monomers indicated (second group in the table) together with the initiator solution (third group in the table) were added to the solvent as indicated (first group in the table), during five hours at 95° C., and reacted after the end of the addition for a further two hours. After cooling, the reaction mass was diluted with further butanol to a mass fraction of solids of about 65%.

For the inventive (1a, 1b and 1c) examples, the monomers indicated (second group in the table) together with the initiator solution (third group in the table) were added to the mixture of ε-caprolactone and solvent as indicated (first group in the table), during five hours at 155° C., and reacted after the end of the addition for a further four hours. After cooling to 80° C., the reaction mass was diluted with further butanol to a mass fraction of solids of about 65%.

TABLE 1

Composition (mass in g) and Properties of Hydroxy-Functional Acrylic Copolymers

|  | C1 | C2 | 1a | 1b | 1c |
|---|---|---|---|---|---|
| methoxy propoxy propanol | 3.25 | 3.25 | 3.25 | 3.25 | 3.25 |
| ε-caprolactone |  |  | 6.25 | 6.25 | 6.25 |
| n-butanol | 23.0 | 23.0 |  |  |  |
| 4-hydroxybutyl acrylate | 12.5 | 12.5 | 12.5 | 12.5 | 12.5 |
| 2-hydroxyethyl methacrylate | 8.2 | 8.2 | 4.38 | 4.38 | 4.38 |
| styrene | 19.4 | 19.4 | 25.44 | 25.44 | 25.44 |
| n-butyl acrylate | 10.1 | 10.1 | 7.69 | 7.69 | 7.69 |
| isobutyl methacrylate | 12.5 |  | 6.25 |  |  |
| glycidyl methacrylate |  |  |  |  | 0.3 |
| isodecyl methacrylate |  | 12.5 |  | 6.25 | 6.25 |
| t-amyl per-2-ethyl-hexanoate |  |  | 2.95 | 2.95 | 2.95 |
| methoxy propoxy propanol | 3.0 | 3.0 | 3.0 | 3.0 | 3.0 |
| azo-bis (isovaleronitrile) | 2.4 | 2.4 |  |  |  |
| n-butanol |  | 6.0 |  |  |  |
| isopropanol | 5.65 |  | 29.0 | 29.0 | 3.0 |
| mass fraction of solids in % | 65 | 65 | 65 | 65 | 65 |
| glass transition temperature in ° C. | 10 | 1 | 14 | 9 | 1 |
| hydroxyl number in mg/g | 129 | 129 | 103 | 103 | 129 |
| weight average molar mass $M_w$ in kg/mol | 14 | 21 | 12.2 | 17.5 | 15 |

Example 2

Carboxyl functional acrylic polymers 2 have been prepared from monomer mixtures as stated in Table 1. The monomers indicated (second group in the table) together with the initiator solution (third group in the table) were added to the solvent as indicated (first group in the table), during six hours at 95° C. (azobis isobutyronitrile, AIBN, as initiator) or 115° C. (t-butyl peroctoate as initiator), and reacted after the end of the addition for a further two hours. After cooling, the reaction mass was diluted with further alcohol to a mass fraction of solids of about 50%.

TABLE 2

Composition (mass in g) and Properties of Carboxyl-Functional Acrylic Copolymers

|  |  | 2a | 2b | 2c |
|---|---|---|---|---|
| isopropanol |  | 37.8 |  |  |
| n-butanol |  |  | 40.0 | 40.0 |
| acrylic acid |  | 10.5 | 31.0 |  |
| methacrylic acid |  |  |  | 24.5 |
| n-butyl acrylate |  | 18.8 |  |  |
| styrene |  | 13.5 | 26.0 | 18.5 |
| isobutyl methacrylate |  | 6.1 | 18.0 | 27.0 |
| 2-ethyl hexyl acrylate |  |  | 62.0 |  |
| azo-bis (isovaleronitrile) |  | 1.7 | 2.5 |  |
| t-butyl peroctanoate |  |  |  | 3.5 |
| n-butanol |  | 11.7 |  | 60.0 |
| isopropanol |  |  | 62.0 |  |
| mass fraction of solids | in % | 51 | 50 | 51 |
| glass transition temperature | in ° C. | 17 | 21 | 15 |
| acid number | in mg/g | 162 | 235 | 155 |
| weight average molar mass $M_w$ | in kg/mol | 12.0 | 14.0 | 17.5 |

Example 3

The polymer solutions of Examples 1 and 2 were mixed in the ratios stated in Table 3, heated to about 120° C. whereupon the solvent was distilled off under slightly reduced pressure until a mass fraction of solids of at least 95% was reached. The mixture was held at this temperature of between 100° C. and 120° C. until the polymer was water-reducible (no formation of sediment during two hours of observation time) after full neutralisation with dimethyl ethanolamine, and a dispersion of an average particle size of less than 150 nm was obtained, as determined with dynamic light scattering in a "particle sizer". After the end of the reaction, the product was cooled, neutralised with the said amine, and slowly diluted with deionised water under formation of an aqueous dispersion.

TABLE 3

Acrylic Dispersions 3a to 3d

|  |  | 3a | 3b | 3c | 3d |
|---|---|---|---|---|---|
| Hydroxy functional polymer 1 | | | | | |
| C1 | | 75.0 | | | |
| C2 | | | 75.0 | | |
| 1a | | | | 75.0 | |
| 1b | | | | | 75.0 |
| Carboxyl functional Polymer 2 | | | | | |
| 2a | | 32.5 | 32.5 | 32.5 | 32.5 |
| 2-(N,N-dimethylamino) ethanol | | 3.7 | 3.7 | 3.7 | 3.7 |
| deionised water | | 70.0 | 80.0 | 70.0 | 78.0 |
| mass fraction of solids | in % | 45 | 42.4 | 45.5 | 43.1 |
| dynamic viscosity | in m · Pas | 910 | 730 | 2100 | 1330 |
| pH | | 8.5 | 8.5 | 8.5 | 8.7 |
| average particle size | in nm | 167 | 115 | 147 | 131 |
| acid number | in mg/g | 41 | 40 | 40 | 40 |
| hydroxyl number | in mg/g | 97 | 97 | 78 | 78 |
| glass transition temperature $T_g$ | in ° C. | 11 | 4 | 15 | 11 |

Example 4

White pigmented coating compositions 4a through 4d have been prepared according to the recipe stated in the top section of Table 4. Binders 3a through 3d of Example 3 were mixed and milled with the white pigment (titanium dioxide, ®Kronos 2310, Kronos Titan GmbH), a wetting agent having both nonionic and ionic hydrophilicity (®Additol VXW 6374, Cytec Surface Specialties Austria GmbH), a defoamer (®Surfynol 104 E, nonionic wetting agent based on acetylene diol, Air Products) and a silicone based levelling agent (®Additol VXL 4930, Cytec Surface Specialties Austria GmbH). Butyl diglycol was added as coalescing adjuvant, and deionised water was used to reduce to a mass fraction of solids of about 58%.

According to the recipe stated in the middle section, for the preparation of the paint, further quantities of the same binders were added to the pigment pastes thus prepared, together with an imino, mixed ether type melamine resin, ®Maprenal VMF 3924 (Ineos Melamines GmbH), and other additives as stated in the table.

After addition of the crosslinker and other additives, further deionised water was added in an amount such that the efflux time from a 4 mm cup (according to DIN 53 211) was adjusted to thirty seconds for all paints.

TABLE 4 white paints (quantities of constituents in g)

| | 4a = paint 1 | 4b = paint 2 | 4c = paint 3 | 4d = paint 4 |
|---|---|---|---|---|
| 3a | 24.2 | | | |
| 3c | | 25.7 | | |
| 3d | | | 24.5 | |
| 3b | | | | 25.7 |
| TiO$_2$ pigment | 21.8 | 21.8 | 21.8 | 21.8 |
| defoamer | 0.9 | 0.9 | 0.9 | 0.9 |
| wetting agent | 1.1 | 1.1 | 1.1 | 1.1 |
| levelling agent | 0.1 | 0.1 | 0.1 | 0.1 |
| butyl diglycol | 4.1 | 4.1 | 4.1 | 4.1 |
| water | 5.2 | 5.2 | 5.2 | 5.2 |
| 3a | 21.06 | | | |
| 3c | | 22.4 | | |
| 3d | | | 21.4 | |
| 3b | | | | 22.4 |
| crosslinker | 9.6 | 9.6 | 9.6 | 9.6 |
| N-methylpyrrolidone | 0.9 | 0.9 | 0.9 | 0.9 |
| n-dodecane | 0.9 | 0.9 | 0.9 | 0.9 |
| ® Texanol | 2.8 | 2.8 | 2.8 | 2.8 |
| ® Proglyde DMM | 1.7 | 1.7 | 1.7 | 1.7 |
| water | 12.0 | 10.7 | 11.0 | 12.7 |
| pH | 8.4 | 8.2 | 8.3 | 8.6 |

® Texanol is a trade mark of Eastman Chemical Company for 2,2,4-trimethyl-1,3-pentane diol monosiobutyrate, a coalescing agent
® Proglyde DMM is a trade mark for dipropylene glycol dimethyl ether Example 5

Testing of Coatings

The following properties were found:
upon application of a 200 µm wet film onto a glass plate, drying for ten minutes at room temperature, ten minutes of forced drying at 80° C., and further twenty-five minutes of forced drying at 130° C., as shown in Table 5a TABLE 5a Coating Properties

| Paint | | 1 (comp.) | 2 | 3 | 4 |
|---|---|---|---|---|---|
| Pendulum Hardness | in s | 177 | 176 | 175 | 157 |
| Dry Film Thickness | in µm | 38 | 40 | 40 | 38 |
| Gloss 20° | | 46 | 69 | 79 | 67 |
| Haze 20° | | 75 | 90 | 41 | 54 |

While the addition of long chain alkyl methacrylate to the binder polymer (paint 4) increases the gloss and reduces the haze of the coating prepared with the said binder, the pendulum hardness is impaired by such addition. Combination (paint 3) of long chain alkyl methacrylate and caprolactone retains the hardness level of the unmodified binder (paint 1) while having the favourable gloss and haze properties of the long chain alkyl methacrylate modified binder. Addition of caprolactone alone (paint 2) increases the gloss while leaving the hardness unchanged, but there is a significant increase in haze.

In a further paint test, the paints were poured onto a glass plate, to yield a coating with a dry film thickness of 30 µm, dried for ten minutes at room temperature, ten more minutes of forced drying at 80° C., and further twenty-five minutes of forced drying at 130° C., coatings with properties as shown in Table 5b were obtained.

TABLE 5b

Coating properties

| Paint | | 1 (comp.) | 2 | 3 | 4 |
|---|---|---|---|---|---|
| Pendulum Hardness | in s | 183 | 181 | 181 | 168 |
| Wave Scan, Long Wave | | 8 | 7 | 6 | 9 |
| Wave Scan, Short Wave | | 7 | 11 | 7 | 6 |
| Gloss 20° | | 60 | n.d. | 79 | 67 |
| Haze 20° | | 82 | n.d. | 35 | 65 | n.d. stands for "not determined"

For hardness, gloss, and haze, virtually the same results as in 5a have been obtained. Wave Scan is a method to judge the surface quality, especially freedom from defects and "orange peel" structure. Low values in this test for both short and long wave mean that the surface appears faultless.

The mechanical properties were tested on a coating on a steel sheet, with a 40 µm dry film thickness. The paint was applied by spraying, and subsequently dried (ten minutes at room temperature, ten minutes at 80° C., and further twenty-five minutes at 130° C. The values found are listed in table 5c.

TABLE 5c

Mechanical Properties

| Paint | | 1 (comp.) | 2 | 3 | 4 |
|---|---|---|---|---|---|
| Pendulum Hardness | in s | 171 | 171 | 174 | 169 |
| Cross Cut Test | | 4 ... 5 | 3 | 2 | 2 ... 3 |
| Erichsen Cupping | in mm | 13 | 5 | 66 | 51 |
| Gloss 20° | | 48 | 71 | 80 | 71 |
| Haze 20° | | 78 | 97 | 49 | 69 |

While paint 2 already shows better gloss when compared to a paint where the binder does not comprise the epsilon caprolactone (comparative paint 1), further improvement can be seen in paints 3 and 4 where not only the gloss is higher than that of the comparative paint 1, there is also a marked reduction in haze. The highest gloss and lowest haze are found in paints (3) that comprise both the epsilon caprolactone and the long chain alkyl methacrylate. See Table 5c.

Likewise, while the hardness is on par with that of the comparative coating (paint 1), also the wave scan is reduced, in one aspect each for paints 2 and 4, and both in long and short wave, in paint 3. This synergistic behaviour could not have been expected.

Also, the mechanical properties and adhesion are favourably influenced, with a synergistic effect for paint 3 also shown in Erichsen cupping and Cross Cut Test (DIN EN ISO 2409).

The invention claimed is:

1. A high-gloss coating composition comprising a crosslinker selected from the group consisting of aminoplast compounds and isocyanates, and a water-reducible mixture of (meth)acrylic copolymers having a hydroxyl number of from 40 mg/g to 250 mg/g, an acid number of from 15 mg/g to 80 mg/g, a weight average molar mass $M_w$ from 9 kg/mol to 40 kg/mol and a glass transition temperature $T_g$ from −40° C. to 80° C., wherein polymerized monomers of the mixture comprising at least one alkyl ester A of an olefinically unsaturated carboxylic acid having from 1 to 8 carbon atoms in the alkyl group, at least one hydroxy functional alkyl ester B of an olefinically unsaturated carboxylic acid, at least one aliphatic compound C that has both hydroxy and carboxyl functionalities, or which is a lactone or a cyclic lactone, at least one vinyl monomer D which does not comprise a moiety derived from an olefinically unsaturated carboxylic acid, and at least one olefinically unsaturated carboxylic acid E selected from the group consisting of acrylic acid and methacrylic acid, wherein the mixture comprises a hydroxy-functional copolymer 1 which has a mass fraction of moieties derived from monomers A, B, C, and D as follows: from 5% to 35% for A, from 15% to 40% for B, from 2% to 20% for C, and from 25% to 55% for D, a carboxyl-functional copolymer 2 which has a mass fraction of moieties derived from monomers A, D, and E as follows: from 25% to 80% for A, from 10% to 40% for D, and from 10% to 50% for E, and a copolymer 12 which is the product of esterification of copolymer 1 with copolymer 2, under consumption of from 0.5% to 20% of the carboxyl groups of copolymer 2.

2. The coating composition of claim 1, wherein the mixture also comprises polymerized monomers selected from epoxy functional alkyl esters F of an olefinically unsaturated carboxylic acid, and wherein the mixtures comprise moieties derived from the said monomers in mass fractions of from 10% to 50% of monomers A, from 5% to 35% of monomers B, from 1% to 25% of monomers C, from 20% to 50% of monomers D, from 2% to 20% of monomers E, and from 0.1% to 3.0% of monomers F, where the sum of all mass fractions equals 100%.

3. The coating composition of claim 1, wherein the mixture also comprises polymerized monomers selected from alkyl esters G of an olefinically unsaturated carboxylic acid having from 9 to 40 carbon atoms in the alkyl group, and wherein the mixtures comprise moieties derived from the said monomers in mass fractions of from 10% to 50% of monomers A, from 5% to 35% of monomers B, from 1% to 25% of monomers C, from 20% to 50% of monomers D, from 2% to 20% of monomers E, and from 0.2% to 15% of monomers G, where the sum of all mass fractions equals 100%.

4. The coating composition of claim 1, wherein the mixture comprises moieties derived from the said monomers in mass fractions of from 15% to 40% of monomers A, from 10% to 30% of monomers B, from 2% to 20% of monomers C, from 25% to 45% of monomers D, and from 3% to 15% of monomers E, where the sum of all mass fractions equals 100%.

5. The coating composition of claim 2, wherein the mixture comprises moieties derived from the said monomers in mass fractions of from 15% to 40% of monomers A, from 10% to 30% of monomers B, from 2% to 20% of monomers C, from 25% to 45% of monomers D, from 3% to 15% of monomers E, and from 0.2% to 2.0% of monomers F where the sum of all mass fractions equals 100%.

6. The coating composition of claim 3, wherein the mixture comprises moieties derived from the said monomers in mass fractions of from 15% to 40% of monomers A, from 10% to 30% of monomers B, from 2% to 20% of monomers C, from 25% to 45% of monomers D, from 3% to 15% of monomers E, from 0.2% to 2.0% of monomers F, and from 2% to 12% of monomers G where the sum of all mass fractions equals 100%.

7. A process of making a mixture of copolymers, wherein polymerized monomers of the mixture comprising at least one alkyl ester A of an olefinically unsaturated carboxylic acid having from 1 to 8 carbon atoms in the alkyl group, at least one hydroxy functional alkyl ester B of an olefinically unsaturated carboxylic acid, at least one aliphatic compound C that has both hydroxy and carboxyl functionalities, or which is a lactone or a cyclic lactone, at least one vinyl monomer D which does not comprise a moiety derived from an olefinically unsaturated carboxylic acid, and at least one olefinically unsaturated carboxylic acid E selected from the group consisting of acrylic acid and methacrylic acid, wherein the mixture comprises a hydroxy-functional copolymer 1 which has a mass fraction of moieties derived from monomers A, B, C, and D as follows: from 5% to 35% for A, from 15% to 40% for B, from 2% to 20% for C, and from 25% to 55% for D, a carboxyl-functional copolymer 2 which has a mass fraction of moieties derived from monomers A, D, and E as follows: from 25% to 80% for A, from 10% to 40% for D, and from 10% to 50% for E, and a copolymer 12 which is the product of esterification of copolymer 1 with copolymer 2, under consumption of from 0.5% to 20% of the carboxyl groups of copolymer 2; comprises preparing in the first step, a hydroxy functional acrylate copolymer 1 by polymerizing a mixture of monomers containing at least one monomer each of the groups of A, B, C, and D to obtain a hydroxy functional copolymer 1, preparing in a separate second step, a carboxyl functional copolymer 2 by polymerizing a mixture of monomers containing at least one monomer each of the groups of A, D, and E, and in a third consecutive step, performing a condensation reaction between copolymers 1 and 2 under esterification conditions to obtain, under consumption of from 0.5% to 20% of the carboxyl groups of copolymer 2 which carboxyl groups are consumed by esterification with hydroxy groups of copolymer 1, a polymer 12, in a mixture with unreacted copolymers 1 and 2.

8. The process of claim 7 wherein in the preparation of the hydroxy functional copolymer 1, at least one of the monomers of groups of F and G are also present in the said mixture of monomers, wherein the monomers of group F are epoxy functional alkyl esters of an olefinically unsaturated carboxylic acid, and the monomers G are alkyl esters of an olefinically unsaturated carboxylic acid having from 9 to 40 carbon atoms in the alkyl group.

9. The process of claim 7 or of claim 8 wherein the mixture of copolymers is neutralised by adding a neutralisation agent selected from the group consisting of aqueous alkali, ammonia, and organic amines.

10. A method of use of the mixture of copolymers of claim 1 as a binder in the preparation of paints comprising neutralising the mixture of copolymers of claim 1 by adding a neutralisation agent selected from the group consisting of aqueous alkali, ammonia, and organic amines, diluting with water, adding thereto at least one additive selected from the group consisting of crosslinkers, defoamers, wetting agents, levelling agents, coalescing agents, dispersing agents, and antisettling agents, pigments and fillers, and homogenising this mixture.

* * * * *

UNITED STATES PATENT AND TRADEMARK OFFICE
CERTIFICATE OF CORRECTION

PATENT NO. : 8,546,479 B2  
APPLICATION NO. : 12/293091  
DATED : October 1, 2013  
INVENTOR(S) : Billiani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 961 days.

Signed and Sealed this

Fifteenth Day of September, 2015

Michelle K. Lee
*Director of the United States Patent and Trademark Office*